United States Patent [19]

Lowe

[11] 4,299,851
[45] Nov. 10, 1981

[54] FLAVORING DISPENSER

[76] Inventor: Henry E. Lowe, 21725 Allegheny St., Cassopolis, Mich. 49031

[21] Appl. No.: 117,773

[22] Filed: Feb. 1, 1980

[51] Int. Cl.³ .............................................. B65D 81/34
[52] U.S. Cl. ..................................... 426/132; 99/345; 229/3.5 MF; 426/113; 426/135; 426/115
[58] Field of Search .............. 426/129, 124, 113, 126, 426/412, 420, 132, 112, 115, 523, 135; 99/345–347; 229/3.5 MF, 87 F; 206/0.5

[56] References Cited

U.S. PATENT DOCUMENTS

| 2,528,233 | 10/1950 | Kubricht | 426/132 |
| 2,652,765 | 9/1953 | Risco | 99/345 |
| 2,759,830 | 8/1956 | Touceda | 426/132 |
| 2,858,224 | 10/1958 | Darrah | 426/119 |
| 2,902,371 | 9/1959 | Shorr | 426/132 |
| 3,042,532 | 7/1962 | Daline | 426/132 |
| 3,150,982 | 9/1964 | Eickerman | 206/0.5 |
| 3,162,539 | 12/1964 | Repko | 426/119 |
| 3,613,555 | 10/1971 | Ogman | 426/523 |
| 3,762,307 | 10/1973 | Badovinac | 99/345 |
| 3,985,069 | 10/1976 | Cavalluzzi | 426/77 |
| 4,061,083 | 12/1977 | Caliva | 426/523 |
| 4,129,066 | 12/1978 | Corley | 99/345 |

FOREIGN PATENT DOCUMENTS 1460 4/1979 European Pat. Off. .

Primary Examiner—Steven L. Weinstein
Attorney, Agent, or Firm—Marmaduke A. Hobbs

[57] ABSTRACT

A flavoring dispenser in which upper and lower layers are sealed to each other along their edges to form a pouch-like structure. A flavoring substance is contained in the structure and a plurality of apertures are disposed in the lower layer. The dispenser is placed on meat or other food being cooked, and the flavoring substance seeps from the dispenser onto the food. The flavoring is a liquid or other substance which liquifies during the cooking of the food. The steam and heat from the food and/or from the flavoring substance cause the pouch to swell, thereby forcing the flavoring substance through the apertures. A plurality of dispensers may be packaged in a sheet-like arrangement with perforations between the individual dispensers permitting each to be detached from the sheet.

4 Claims, 7 Drawing Figures

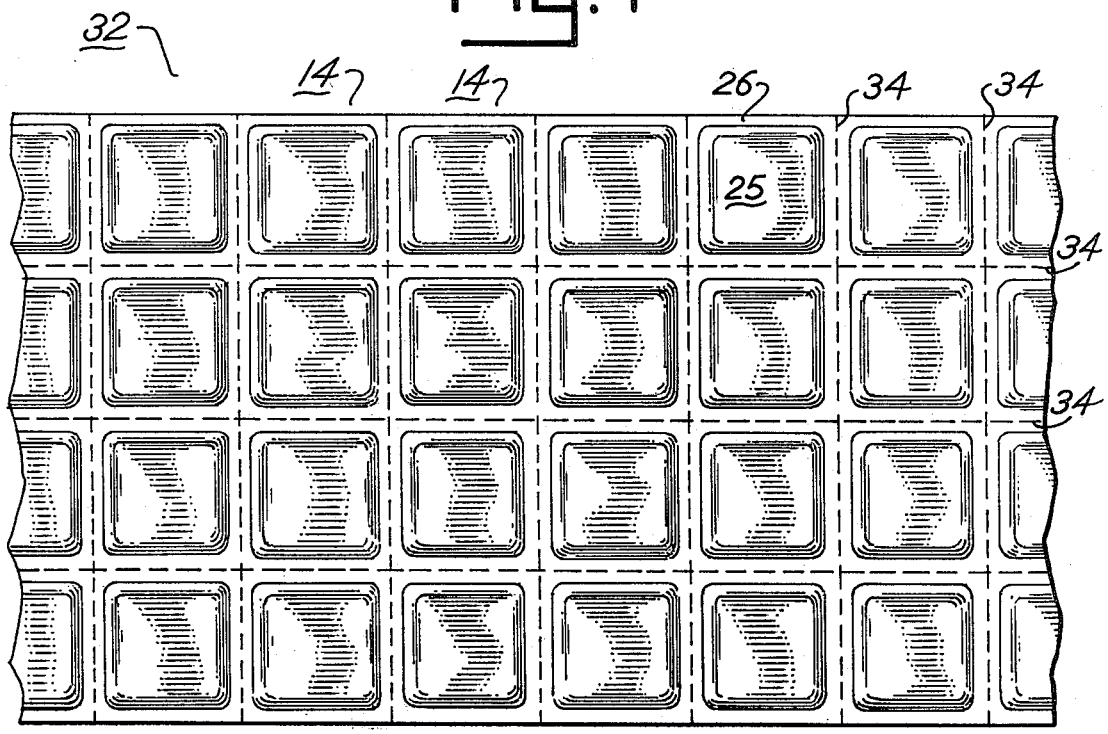
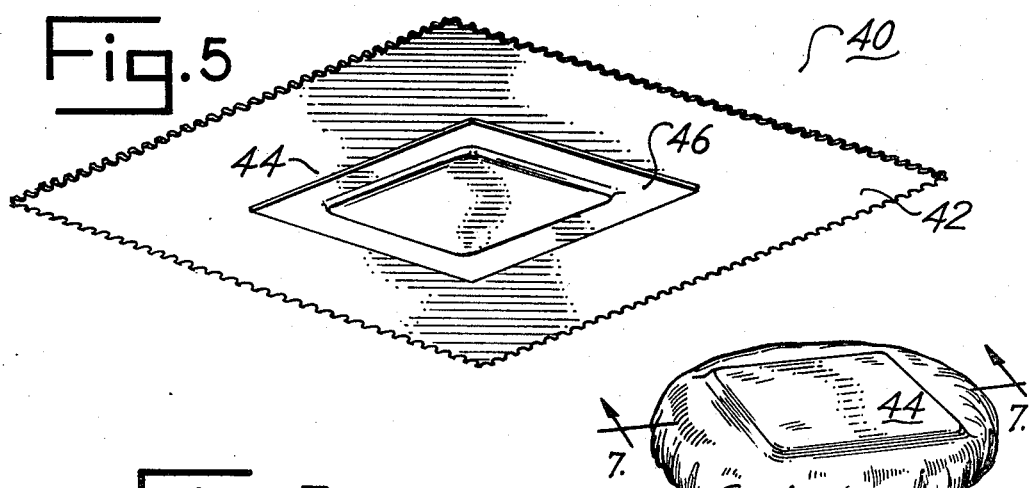
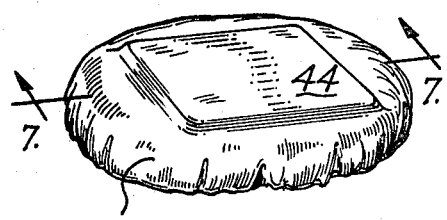
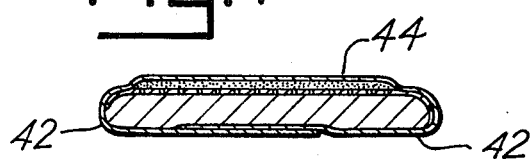

FLAVORING DISPENSER

During the preparation of cooked foods, flavorings or seasonings are frequently used to add to and enhance the natural flavor of the food. A common means for applying flavoring is to sprinkle dried or liquid forms of the desired ingredient onto the food during the preparation thereof, and perhaps shake more of the ingredient onto the food as the food is cooked. Some cooks prefer to add flavorings and seasonings only after the food has begun to cook, thus enabling the added ingredients to immediately combine with the juices flowing from the food. In the preparation of some foods, particularly meats, peak flavor levels are achieved most readily by frequent applications or bastings of a liquid form of flavoring, or of the seasoned meat juices, over the meat. The frequent bastings permit the flavoring liquid to flow through the meat and fully impregnate it with the flavor. The basting of meat with the flavoring liquid or seasoned meat juices also assists in reducing the loss of moisture from the meat during cooking, thus resulting in a more moist and juicy cooked meat than if the meat were not basted.

A person preparing a full meal often becomes involved in the preparation of several foods at the same time, and may either forget or be unable to add periodically the flavoring ingredients to the dishes as desired. Further, it is not uncommon that some foods, especially those which require a substantial amount of cooking time, are cooked for at least a portion of the preparation time while the cook is out of the kitchen, and hence not available to add the flavoring as required. With the increasing popularity of programmable timers now available on ovens and stoves, it is possible to program the cooking of food dishes to begin during the absence of the cook. Since it is sometimes preferable to add flavoring and seasoning only after the food has begun to cook, or to frequently add flavoring while the food cooks, if the preparer is not present or is otherwise detained, the conventional methods of applying dried or liquid flavorings are not suitable. Attempts have been made to design dispensng devices which will add flavorings or seasonings to the food being cooked throughout the cooking period. Many of these devices have been difficult to use, and some have been designed as a part of a piece of cookware, such as a roasting pan; thus, they are available only through the purchase of a costly item, and are usable only when that specific pan is used. Others have directed the seasoning discharged therefrom to only a small area in the food, and thus relied extensively on the flavoring being able to flow through the food to adequately season the food.

It is therefore one of the principal objects of the present invention to provide a flavoring dispenser which will release seasonings and flavorings onto the food being cooked throughout an extended period of time, and which will release the flavoring over a large area to disperse the flavoring throughout the food.

Another object of the present invention is to provide a flavoring dispenser which can be placed on the food before the cooking begins, yet will release the flavoring only after the cooking has begun, and which aids in the basting of meats and the like to minimize the amount of moisture lost from the meat during cooking.

A further object of the present invention is to provide a flavoring dispenser which can be used for a variety of different seasonings and flavorings and which can be packaged in a manner for convenient storage and use.

Yet another object of the present invention is to provide a disposable flavoring dispenser which is prepackaged to contain the flavoring or seasoning, and which can be used in conventional cookware without modification thereof, as well as on barbecue grills, in barbecue pits, and the like when conventional cookware is not used.

Additional objects and advantages of the present flavoring dispenser will become apparent from the following detailed description and the accompanying drawings wherein:

FIG. 4 is a plan view showing the manner in which a plurality of the dispensers may be packaged for convenient storage and use;

FIG. 5 is a perspective view of a modified form of the flavoring dispenser shown in the preceding figures;

FIG. 6 is a perspective view of the modified form shown in FIG. 5 applied to a hamburger; and FIG. 7 is a vertical cross sectional view of the hamburger and dispenser shown in FIG. 6, taken on line 7—7 of the latter figure.

Figure 1:
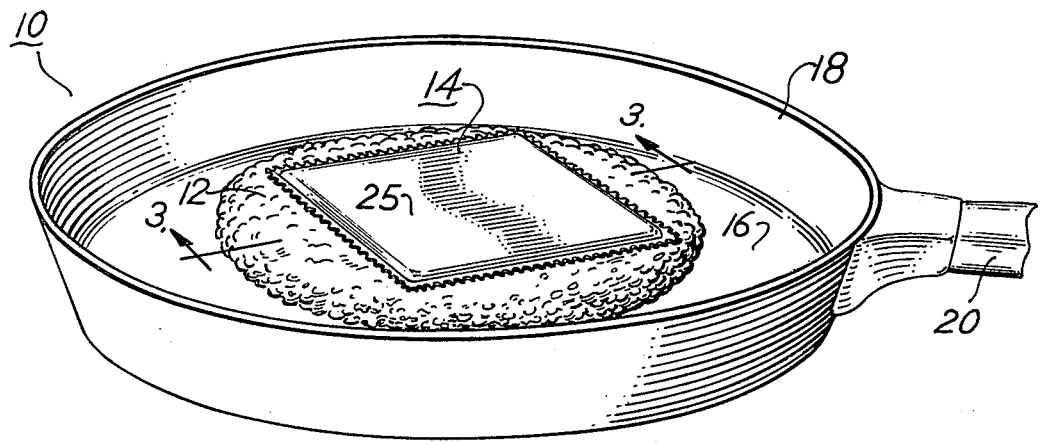
FIG. 1 is a perspective view showing a hamburger in a frying pan, with a flavoring dispenser embodying the present invention placed thereon.
Figure 2:
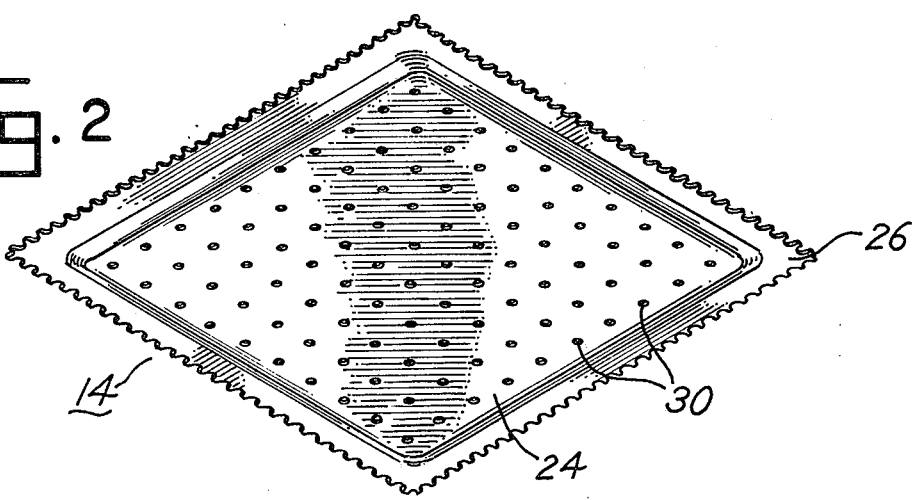
FIG. 2 is a perspective view of the underside of the flavoring dispenser shown in FIG. 1.
Figure 3:
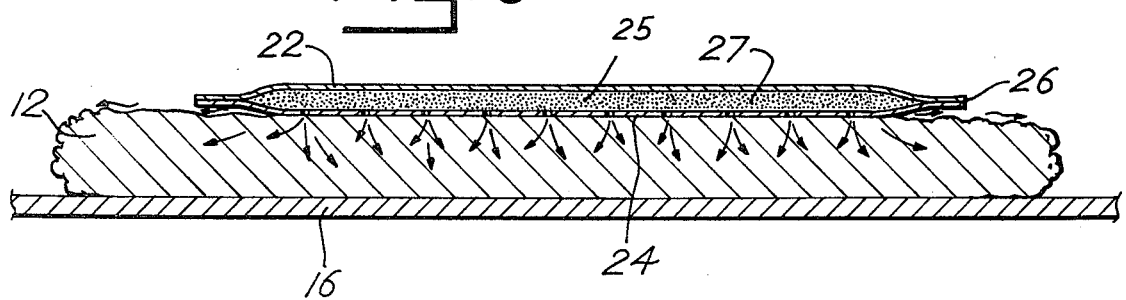
FIG. 3 is an enlarged, cross sectional view of the hamburger, dispenser and pan shown in FIG. 1, taken on line 3—3 of the latter figure.

Referring more specifically to the drawings and to FIG. 1 in particular, numeral 10 designates a frying pan or skillet having therein a hamburger 12 with a flavoring dispenser 14 thereon. Frying pan 10 has a bottom 16 with an upwardly extending side wall 18 and a handle 20. Flavoring dispenser 14 may be used in the preparation of foods other than the hamburger shown; however, the use of the dispenser is particularly advantageous for the preparation of meat. The dispenser may be made in a variety of sizes and shapes suitable for particular applications. Thus, dispensers intended primarily for use on steaks or roasts may be larger than dispensers intended for use on hamburgers.

Dispenser 14 is essentially an envelope or pouch-like structure, having an upper layer 22 and a lower layer 24 sealed to each other near their respective edges and slightly inwardly therefrom. A suitable material for use as upper and lower layers is aluminum foil designed for use in cooking. Dispenser 14 thus has a pouch or cavity 25 between upper layer 22 and lower layer 24, the pouch being surrounded by a flange 26 formed by the portions of the upper and lower layers which are sealed to each other. A flavoring or seasoning substance 27 is contained in pouch 25 between the upper and lower layers, and lower layer 24 has a plurality of apertures 30 therein. The size and number of apertures 30 in layer 24 will vary, depending upon the nature and form of flavoring or seasoning substance 27 being used. Common flavoring substances which may be used in the present dispenser include commonly available barbecue type flavorings, such as hickory flavored liquids, smoke flavored liquids and the like, as well as powdered or granulated seasonings such as garlic flavoring, onion flavoring, salt or the like. If liquid substances are used, normally apertures 30 will be smaller than if powdered or granulated substances are used. In some applications it is desirable to use jellied forms of flavoring which will liquify from the heat and moisture of the food being cooked. The jellied forms of flavoring are especially advantageous when the dispenser is used for foods prepared in advance and left in the oven to begin cooking at some later time after the oven has been started by a timer. The heat from cooking will liquify the flavoring to begin the dispensing thereof only after cooking has begun.

For convenience in use and storage of the dispensers, a plurality of pouches may be produced in a large sheet 32, as shown in FIG. 4. The areas of upper and lower layers which are attached to each other to form the pouches therebetween are provided with perforated lines 34, the perforations permitting each individual dispenser 14 to be separated from the other dispensers in sheet 32. Each of the dispensers in sheet 32 may contain the same flavoring substance 27, or dispensers having a variety of different flavoring substances may be included on the same sheet.

In the use of the embodiment of flavoring dispensers shown in FIGS. 1 through 4, a dispenser 14 containing the desired flavoring or seasoning is detached from sheet 32 by tearing along the perforated lines between adjoining dispensers. When used to flavor meat, the dispenser is placed on top of the meat with perforated layer 24 facing the meat, when the meat is being made ready for cooking. For large pieces of meat, such as steaks and the like, two or more dispensers may be used to cover the meat, or larger dispensers may be used. During the cooking of the meat, the flavoring or seasoning substance 27 within dispenser 14 flows through apertures 30 and onto the meat. If the flavoring substance is in a liquid form, tiny drops thereof will flow through the apertures as soon as the dispenser is placed on the meat. If jellied forms of flavoring are used, the dispensing may be delayed until the meat is heated sufficiently to liquify the flavoring substance contained in the dispenser, and, if a dried form of flavoring is used, such as powder or granules, the release thereof will not begin until steam and moisture rise from the meat, enter the dispenser through apertures 30, dissolve some of the dried flavoring, and cause it to flow from the dispenser onto the meat. The moisture and heat from the meat and/or from the flavoring may cause dispenser 14 to swell slightly, regardless of the form of flavoring substance used, thus increasing the pressure in the dispenser and thereby forcing the flavoring from the pouch onto the meat. The rate of release of flavoring substance 27 onto the food is controlled by the number and size of apertures 30 in perforated layer 24. A large number of apertures of a large size will release the flavoring more quickly onto the food than will a small number of apertures of a relatively small size. If a dispenser large enough to substantially cover the meat, or if a sufficient number of smaller dispensers to cover the meat are used, the flavoring released by the dispenser or dispensers will flow over the entire surface of the meat and the flavoring will be distributed evenly throughout the meat.

When dispenser 14 is placed on top of the meat, it essentially forms a cover over the meat during the cooking thereof. The cover formed by the dispenser substantially reduces the loss of moisture from the meat, since the moisture rising from the meat is trapped by the dispenser and returned to the meat. The natural basting action just described is further enhanced by a modified form of dispenser indicated generally by numeral 40 in FIG. 5. The modified form has an enlarged flange area 42 extending outwardly from the pouch 44 containing the flavoring substance. Flange area 42 may be of adequate size to wrap around the piece of meat to completely envelop the meat, thereby entrapping moisture within the wrap formed by the dispenser. As an alternative, the flange may be of a size large enough to cover the top and sides of the meat or other food, thus forming a more complete cover than that formed by the dispenser described previously. In these forms, the flavor dispensing occurs substantially the same as that previously described. When cooking over open fires at campsites, beaches or other outings, many people prefer to wrap meat, potatoes, ears of corn or the like each individually in aluminum foil and then place the wrapped food directly on, or very near to, the embers of the fire. The embodiment of dispenser shown in FIGS. 5 through 7, which can completely enclose the food, is particularly advantageous in such uses.

To maintain the freshness of the flavoring substance within the dispenser while the dispenser is stored, a sealing sheet 46 may be disposed over perforated layer 24. When the dispenser is to be used, sheet 46 is peeled from layer 24 to expose the apertures therein and permit the flavoring to seep from the dispenser. When a liquid form of flavoring substance 27 is used, which will seep through apertures 30 before the dispenser is heated or before moisture collects therein, a sealing sheet 46 will always be used.

The flavoring dispensers of the present invention are clearly advantageous over the previous types which require that the flavoring be placed in a dispensing receptacle for each use. After they have been used, the present dispensers are simply discarded, leaving nothing to clean and store. Since the dispenser is placed directly on top of the food, the present dispensers may be used with any cookware and do not require the modification thereof.

Although one embodiment and several modifications of a flavoring dispenser have been described in detail herein, various other changes may be made without departing from the scope of the present invention.

I claim:

1. A flavoring dispenser comprising a body structured for placing on top of food being cooked and capable of forcibly dispensing flavoring substances onto the food during cooking, said body having upper and lower layers of aluminum foil sealed to each other near the edges of one of said upper and lower layers defining a cavity therebetween, said cavity being capable of receiving moisture and heat for increasing the pressure in said cavity, a flavoring substance disposed in said cavity, the upper layer defining the cavity being imperforate, the lower layer defining the cavity having a plurality of apertures through which heat and moisture may enter said cavity, said flavoring substance being capable of flowing downwardly through said apertures and onto the food during the cooking of the food, and a foil flange joined integrally with the other of said upper and lower layers and extending outwardly from said edges of said body and be capable of conforming to and at least partially enclosing the food being cooked.

2. A flavoring dispenser as defined in claim 1 in which a sealing sheet is disposed on said lower layer to cover said apertures therein for sealing said dispenser during the storage thereof, said sealing sheet being adapted to peel from said lower layer when said dispenser is used.

3. A flavoring dispenser as defined in claim 1 in which said flavoring substance is a fluid.

4. A flavoring dispenser as defined in claim 1 in which said flavoring substance is a solid.

\* \* \* \* \*